United States Patent
Lee et al.

(10) Patent No.: US 8,351,314 B2
(45) Date of Patent: *Jan. 8, 2013

(54) OPTICAL DISC HAVING PLURALITY OF RECORDING LAYERS, AND METHOD AND APPARATUS FOR RECORDING DATA THEREON

(75) Inventors: Kyung-geun Lee, Seongnam-si (KR); Wook-yeon Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/205,010

(22) Filed: Aug. 17, 2005

(65) Prior Publication Data

US 2005/0286364 A1    Dec. 29, 2005

Related U.S. Application Data

(63) Continuation of application No. 10/966,040, filed on Oct. 18, 2004, now abandoned.

(30) Foreign Application Priority Data

Jun. 23, 2004  (KR) .................................. 2004-46844

(51) Int. Cl.
*G11B 7/24*  (2006.01)

(52) U.S. Cl. ................ 369/53.24; 369/59.25; 369/59.26; 369/94; 369/275.1; 369/275.3

(58) Field of Classification Search ................ 369/59.25, 369/94, 59.26, 275.1, 275.3, 53.24
See application file for complete search history.

(56) References Cited

U.S. PATENT DOCUMENTS

| | | | | |
|---|---|---|---|---|
| 5,729,525 | A * | 3/1998 | Ishida et al. | 369/275.3 |
| 6,072,759 | A * | 6/2000 | Maeda et al. | 369/59.25 |
| 6,424,614 | B1 * | 7/2002 | Kawamura et al. | 369/275.3 |
| 7,072,255 | B2 * | 7/2006 | Sasaki | 369/47.1 |
| 7,110,339 | B2 * | 9/2006 | Suzuki | 369/59.11 |

(Continued)

FOREIGN PATENT DOCUMENTS

EP          0 715 301          6/1996

(Continued)

OTHER PUBLICATIONS

Woerlee et al., "Format of an 8.5 GB double-layer DVD recordable disc," Proceedings of SPIE vol. 5380 (SPIE, Bellingham, WA, 2004).

(Continued)

*Primary Examiner* — Wayne Young
*Assistant Examiner* — Linh Hoffner
(74) *Attorney, Agent, or Firm* — NSIP Law

(57) ABSTRACT

Provided are an optical disc having a plurality of recording layers, and a method and apparatus for recording data thereon. The optical disc has a plurality of recording layers, each recording layer including: a data area; a connecting area; and a remaining area. The data, connecting, and remaining areas are respectively disposed in a direction from an inner circumference of the optical disc to an outer circumference. An outer boundary of each of the data areas is determined according to an amount of data to be recorded. Locations of the connecting areas and the remaining areas are determined by a recording and/or reproducing apparatus according to the determination of the outer boundary of each of the data areas.

6 Claims, 5 Drawing Sheets

U.S. PATENT DOCUMENTS

| | | | |
|---|---|---|---|
| 7,623,432 | B2 | 11/2009 | Koppers et al. |
| 2002/0003760 | A1 | 1/2002 | Honda |
| 2002/0136122 | A1 | 9/2002 | Nakano |
| 2002/0150013 | A1 | 10/2002 | Hsiao |
| 2002/0181376 | A1* | 12/2002 | Acker .................. 369/59.25 |
| 2003/0002420 | A1* | 1/2003 | Yoon et al. ........... 369/59.25 |
| 2003/0063535 | A1 | 4/2003 | Shoji et al. |
| 2003/0067859 | A1 | 4/2003 | Weijenbergh et al. |
| 2003/0137910 | A1* | 7/2003 | Ueda et al. ........... 369/47.14 |
| 2003/0137915 | A1 | 7/2003 | Shoji et al. |
| 2003/0185121 | A1 | 10/2003 | Narumi et al. |
| 2003/0227846 | A1 | 12/2003 | Lee et al. |
| 2004/0120241 | A1* | 6/2004 | Kobayashi et al. .............. 369/94 |
| 2004/0246852 | A1* | 12/2004 | Hwang et al. ............... 369/53.17 |
| 2004/0264322 | A1* | 12/2004 | Shishido et al. ........... 369/47.22 |
| 2005/0018572 | A1* | 1/2005 | Gushima et al. ........... 369/53.15 |
| 2005/0030873 | A1 | 2/2005 | Sasaki |
| 2005/0030874 | A1* | 2/2005 | Sasaki .............................. 369/94 |
| 2005/0041555 | A1* | 2/2005 | Ogawa et al. .................... 369/94 |
| 2005/0207262 | A1* | 9/2005 | Terada et al. .................. 365/232 |
| 2005/0276187 | A1 | 12/2005 | Lee et al. |
| 2006/0181983 | A1* | 8/2006 | Martens et al. ............... 369/47.5 |
| 2006/0203684 | A1* | 9/2006 | Ko et al. ........................ 369/100 |
| 2008/0247305 | A1 | 10/2008 | Narumi et al. |
| 2010/0172227 | A1 | 7/2010 | Shoji et al. |
| 2010/0262985 | A1 | 10/2010 | Hirokane et al. |

FOREIGN PATENT DOCUMENTS

| | | |
|---|---|---|
| EP | 1 244 096 | 9/2002 |
| EP | 1 318 509 | 6/2003 |
| EP | 1329888 | 7/2003 |
| JP | 5-143997 A | 6/1993 |
| JP | 8-212561 A | 8/1996 |
| JP | 10-21673 | 1/1998 |
| JP | 2001-331940 A | 11/2001 |
| JP | 2002-358648 | 12/2002 |
| JP | 2002-373426 A | 12/2002 |
| JP | 2003-22532 A | 1/2003 |
| JP | 2004-362726 | 12/2004 |
| JP | 2007-521597 | 8/2007 |
| JP | 2008-503024 A | 1/2008 |
| KR | 2003-11102 | 2/2003 |
| WO | WO 02/23542 A1 | 3/2002 |
| WO | WO 2005/004119 | 1/2005 |
| WO | WO 2005/122155 | 12/2005 |

OTHER PUBLICATIONS

Royal Philips Electronics, "Double Layer DVD+R Multi-Media Command Set Description, Version 1.00," Jun. 4, 2004, pp. 1-48 [online][retrieved on Jun. 20, 2006]. Retrieved from the Internet <URL: http://www.licensing.philips.com/>.
Supplemental Search Report issued in European Application No. 05750784.0 on Jul. 21, 2008.
Database Compendex [Online], Engineering Information, Inc., NY, US; Apr. 18, 2004, Woerlee P et al: "Format of an 8.5 GB Double-Layer DVD Recordable Disc," XP-002540573, Database accession No. E2004528737406. (Abstract Only).
U.S. Appl. No. 11/429,101, filed May 8, 2006, Kyung-geun Lee et al, Samsung Electronics Co., Ltd.
U.S. Appl. No. 11/430,882, filed May 10, 2006, Kyung-geun Lee et al, Samsung Electronics Co., Ltd.
U.S. Appl. No. 11/430,971, filed May 10, 2006, Kyung-geun Lee et al, Samsung Electronics Co., Ltd.
Royal Philips Electronics, "Double Layer DVD+R Multi-Medial Command Set Description", T10.org Documents, Jun. 4, 2004, Version 1.00, pp. 7-16.
Office Action and Search Report issued in corresponding Taiwanese Patent Application No. 094118120 dated Jun. 24, 2008.
European Search Report issued on Sep. 14, 2009, in counterpart European Application No. 09153307.5 (4 pages).
Canadian Office Action issued on Mar. 16, 2010, in counterpart Canadian Application No. 2 571 525 (4 pages).
Chinese Office Action issued on Apr. 26, 2010, in counterpart Chinese Application No. 200580020691.0 (9 pages, in Chinese, including complete English translation).
Japanese Office Action issued on Jan. 4, 2011, in counterpart Japanese Application No. 2007-517946 (10 pages, in Japanese, with complete English translation).
Canadian Office Action issued on May 31, 2011, in counterpart Canadian Application No. 2 571 525 (4 pages, in English).
Final Rejection dated Dec. 13, 2011, in corresponding Japanese Patent Application No. 2007-517946 and English Translation thereof.
80mm and 120mm DVD-recordable disc (DVD-R), JISx6245, Japanese Standards Association, 1999, pp. 54-60, FIG. 58.
Canadian Examination Report issued May 9, 2012 in counterpart Canadian Patent Application No. 2,571,525 (3 pages, in English).
Japanese Notice of Allowance issued Aug. 7, 2012 in counterpart Japanese Patent Application No. 2012-092299 (3 pages, in Japanese).

* cited by examiner

FIG. 1A (PRIOR ART)

| INNER ZONE | | DESCRIPTION | PURPOSE |
|---|---|---|---|
| LEAD-IN | PRE-RECORDED ZONE | CONTROL DATA ZONE | DISC-RELATED INFORMATION & COPY PROTECTION INFORMATION |
| | REWRITABLE AREA | BUFFER | ... |
| | | RESERVED | FUTURE EXTENSION |
| | | TEST ZONE | OPTIMUM POWER TEST ZONE |
| | | INFORMATION ZONE | INFORMATION RELATED TO RECORDING/REPRODUCING APPARATUS OR DISC STATUS |
| USER DATA AREA | | | |
| LEAD-OUT | | | — |

FIG. 1B (PRIOR ART)

| INNER ZONE | | DESCRIPTION | PURPOSE |
|---|---|---|---|
| LEAD-IN | PRE-RECORDED ZONE | CONTROL DATA ZONE | DISC-RELATED INFORMATION & COPY PROTECTION INFORMATION |
| | READ ONLY AREA | BUFFER | ... |
| | | RESERVED | ... |
| USER DATA AREA | | | |
| LEAD-OUT | | | — |

OPTICAL DISC HAVING PLURALITY OF RECORDING LAYERS, AND METHOD AND APPARATUS FOR RECORDING DATA THEREON

CROSS-REFERENCE TO RELATED APPLICATIONS

This application is a continuation of application Ser. No. 10/966,040 filed on Oct. 18, 2004, now abandoned, which claims the benefit of Korean Patent Application No. 2004-46844 filed on Jun. 23, 2004, in the Korean Intellectual Property Office, the disclosures of which are incorporated herein by reference.

BACKGROUND OF THE INVENTION

1. Field of the Invention

The present invention relates to an optical disc, and more particularly, to an optical disc on which data can be recorded quickly and on which an exclusive region for a specified purpose can be selectively allocated at the outer circumference thereof, and a method of and an apparatus for recording data thereon.

2. Description of Related Art

Optical discs are used as data storage media of optical pickup devices for recording and reproducing data without contact. Two types of optical discs are compact discs (CDs) and digital versatile discs (DVDs), which differ according to recording capacity. Some are recordable, such as the 650 MB CD-R, 650 MB CD-RW, 4.7 GB DVD+R/RW, 4.7 GB DVD-RAM, and DVD-R/RW. Others are read-only, such as the 650 MB CD and 4.7 GB DVD-ROM. Furthermore, a next generation DVD whose recording capacity is over 15 GB is under development.

Presently, the only type of conventional recordable DVD is a 4.7 GB single layer disc. However, DVD-ROMs are available in 8.5 GB dual layer discs. In order to backup these 8.5 GB discs, an 8.5 GB recordable DVD is required. However, in this case, the recording time roughly doubles, which can be a disadvantage for the user. Although the recording speed can theoretically be improved, this would require improvements in disc technology and therefore, a method of effectively recording data at a conventional speed is required to immediately introduce the 8.5 GB recordable DVD to the market.

FIG. 1A illustrates the structure of a conventional rewritable optical disc. FIG. 1B illustrates the structure of a conventional read-only optical disc. The structure of a lead-out area of the rewritable optical disc shown in FIG. 1A is almost the same as the structure of a lead-in area.

FIGS. 2A and 2B illustrate conventional methods of recording data on a dual recording layer disc. FIG. 2A shows the case where the recording direction is an opposite track path (OTP), and FIG. 2B shows the case where the recording direction is a parallel track path (PTP).

As shown in FIGS. 2A and 2B, user data is recorded on a recording layer L1, and then the remaining user data is recorded on a recording layer L2. Pattern data having a lead-out attribute is recorded on an area on which the user data cannot be recorded, in the recording layer L2. Commonly, the area connecting data storage layers to each other is called a connecting area, to discriminate from the lead-out area and the lead-in area. The recording methods shown in FIGS. 2A and 2B can be applied to read-only and rewritable discs.

FIGS. 3A and 3B illustrate other conventional methods of recording data on a dual recording layer disc. FIG. 3A shows the case where the recording direction is an opposite track path (OTP), and FIG. 3B shows the case where the recording direction is a parallel track path (PTP). As shown in FIGS. 3A and 3B, if the total amount of data to be recorded is less than the total capacity of the two recording layers L1 and L2, then in order to record the same amount of data on each of the two recording layers L1 and L2, data is recorded up to a specified position before the lead-out area on each recording layer, and pattern data having the lead-out attribute is recorded on the remaining area. In particular, the pattern data having the lead-out attribute is recorded out to the outermost circumference of the disc.

FIGS. 4A and 4B illustrate other conventional methods of recording data on a dual recording layer disc. FIG. 4A shows the case where the recording direction is the OTP, and FIG. 4B shows the case where the recording direction is the PTP. Like the recording methods shown in FIGS. 3A and 3B, the data recording methods shown in FIGS. 4A and 4B show the case where data is recorded up to a specified position before the lead-out area on each recording layer in order to record the same amount of data on each of the two recording layers L1 and L2, and pattern data having the lead-out attribute is recorded on the remaining area, when the total amount of data to be recorded is less than the total capacity of the two recording layers L1 and L2. However, unlike the recording methods shown in FIGS. 3A and 3B which record the pattern data having the lead-out attribute out to the outermost circumference of the disc, the data recording methods shown in FIGS. 4A and 4B record data only as far as necessary, and do not record the data out to the outermost circumference of the disc.

According to the conventional data recording methods described above, additional data recording time is required to record the pattern data having the lead-out attribute on the area on which user data cannot be recorded.

In the case of a recordable optical disc, a test area to record data for testing is allocated to the optical disc in order to record actual data at an optimum recording power before the actual data is recorded on the optical disc. However, in the case of an optical disc having a plurality of recording layers, since recording characteristics vary according to which recording layer data is recorded on first, the test area must be allocated considering the recording characteristics when the test area for an optimum power control (OPC) is allocated to the optical disc. In particular, when the test area is allocated to the outer circumference area of the optical disc, the characteristics of the outer circumference area must be considered. Also, the process is complicated by the fact that in an optical disc having a plurality of recording layers, the recording characteristics of the outer circumference area are worse than in an optical disc having a single recording layer. Furthermore, when the test area and an area having another purpose are allocated to the outer circumference area of the optical disc, the characteristics of the outer circumference area must also be considered.

BRIEF SUMMARY

An embodiment of the present invention provides an optical disc having a plurality of recording layers on which data can be recorded quickly and on which an exclusive area for a specified purpose can be selectively allocated at the outer area.

An embodiment of the present invention also provides a data recording method and apparatus for recording data on an optical disc having a plurality of recording layers quickly, and selectively allocating an exclusive area for a specified purpose to the outer area.

According to an aspect of the present invention, there is provided an optical disc having a plurality of recording layers, each recording layer including: a data area; a connecting area; and a remaining area. The data, connecting, and remaining areas are respectively disposed in a direction from an inner circumference of the optical disc to an outer circumference. An outer boundary of each of the data areas is determined according to an amount of data to be recorded. Locations of the connecting areas and the remaining areas are determined according to the determination of the outer boundary of each of the data areas.

According to another aspect of the present invention, there is provided an apparatus for recording/reproducing data, including: a write/read unit which transfers data with respect to an optical disc having a plurality of recording layers; and a controller which determines an outer boundary of a data area of each recording layer according to an amount of data to be recorded and which determines corresponding locations of a connecting area and a remaining area of each recording layer according to the determination of the outer boundary of each of the data areas.

According to another aspect of the present invention, there is provided a method of recording data on a plurality of recording layers, the method including: determining an outer boundary of a data area of each recording layer according to an amount of data to be recorded; and determining locations of a connecting area and a remaining area of each recording layer according to the determination of the outer boundary of each of the data areas.

According to another aspect of the present invention, there is provided a computer readable medium having recorded thereon a computer readable program for performing a method of recording data on a plurality of recording layers, the method including: determining an outer boundary of a data area of each recording layer according to an amount of data to be recorded; and determining locations of a connecting area and a remaining area of each recording layer according to the determination of the outer boundary of each of the data areas.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 1A illustrates the structure of a conventional rewritable optical disc;

FIG. 1B illustrates the structure of a conventional read-only optical disc;

DETAILED DESCRIPTION OF EMBODIMENT

Figure 2A:
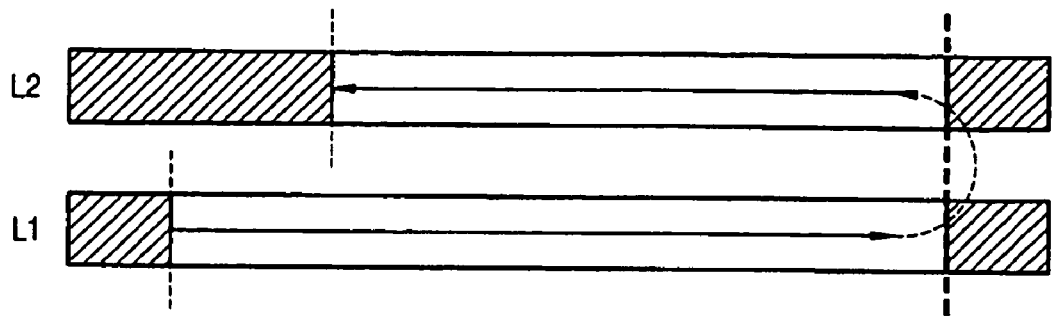
FIGS. 2A and 2B illustrate conventional methods of recording data on a dual recording layer disc.
Figure 2B:
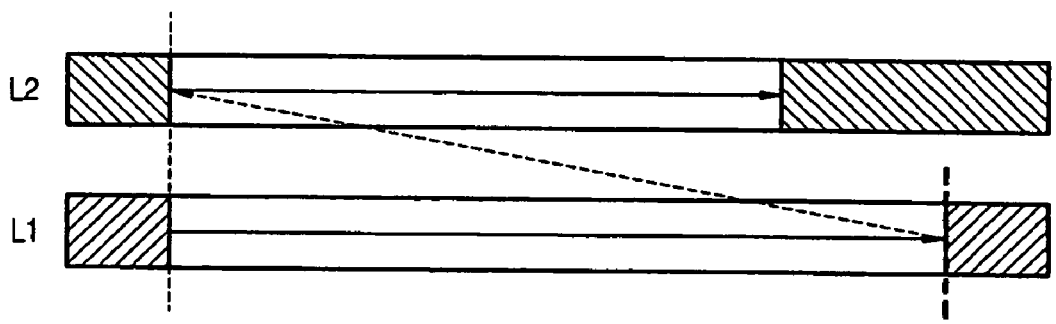
Figure 3A:
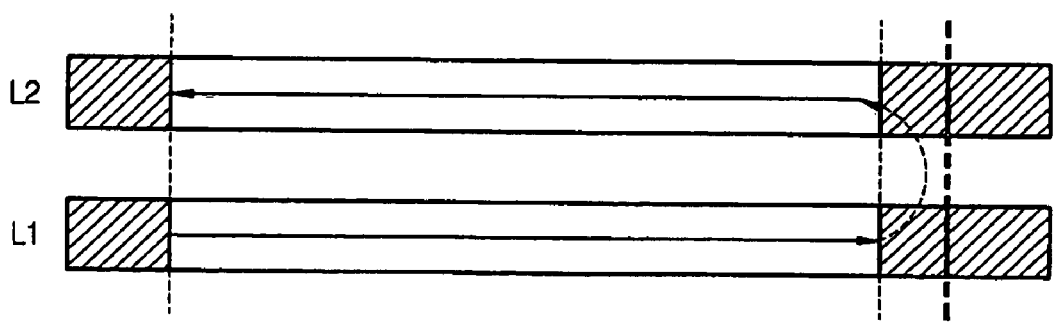
FIGS. 3A and 3B illustrate other conventional methods of recording data on a dual recording layer disc.
Figure 3B:
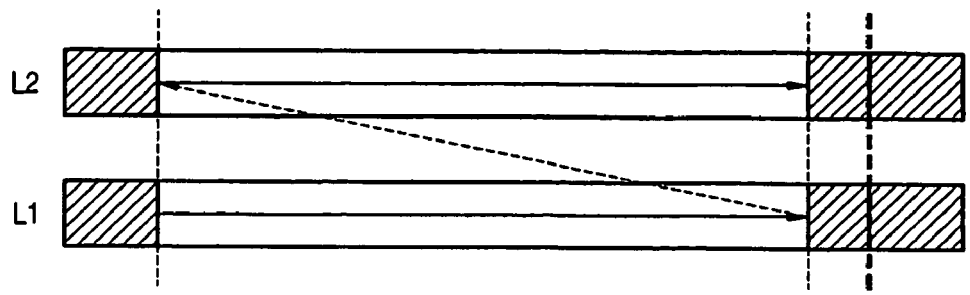
Figure 4A:
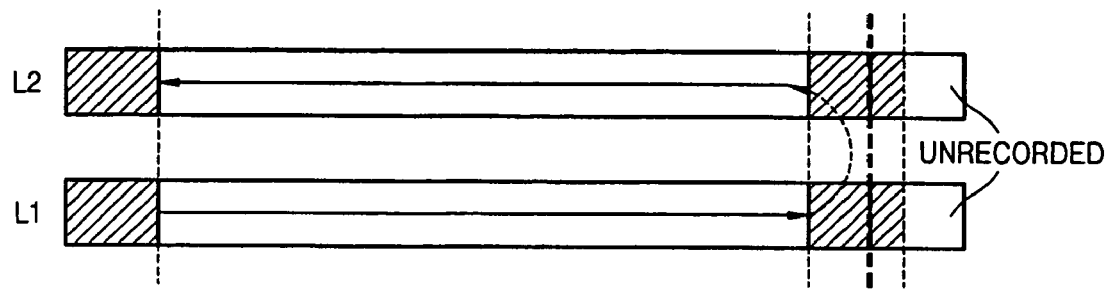
FIGS. 4A and 4B illustrate other conventional methods of recording data on a dual recording layer disc.
Figure 4B:
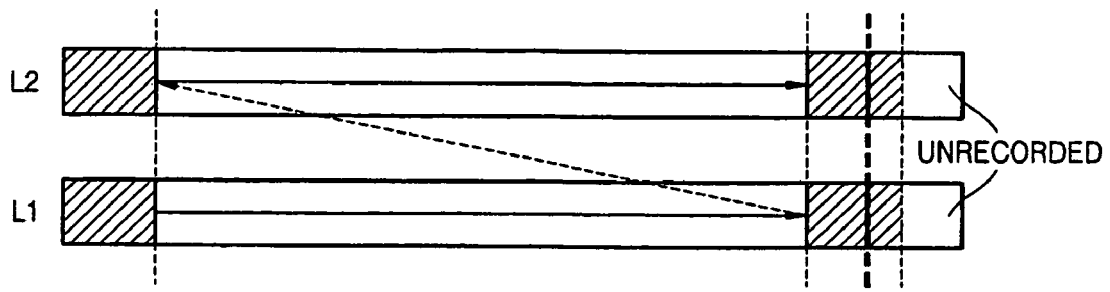

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 5:
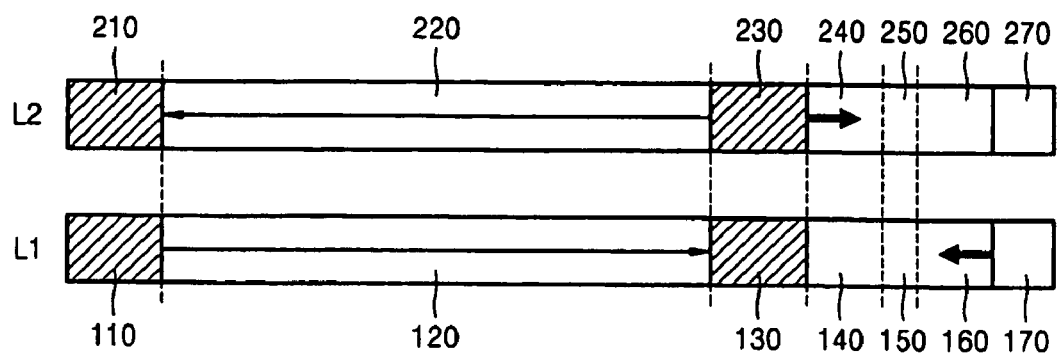
FIG. 5 illustrates the structure of an optical disc according to an embodiment of the present invention.

FIG. 5 illustrates the structure of an optical disc according to an embodiment of the present invention. The optical disc shown in FIG. 5 is a dual layer rewritable optical disc having two recording layers L1 and L2. The recording layer L1 includes a lead-in area 110, a first data area 120, a first connecting area 130, a first non-usage area 140, a first buffer area 150, a first exclusive area 160, and a first non-recording area 170. The recording layer L2 includes a lead-out area 210, a second data area 220, a second connecting area 230, a second exclusive area 240, a second buffer area 250, a second non-usage area 260, and a second non-recording area 270.

A non-limiting example of the detailed structure of the lead-in area 110 is the structure shown in FIG. 1. The structure of the lead-out area 210 is similar to the structure of the lead-in area 110. However, it is to be understood that other structures can be used.

The first data area 120 and the second data area 220 are areas on which to record user data. Data having a specified pattern indicating the end of the first or second data area 120 or 220 is recorded on the first connecting area 130 and the second connecting area 230, respectively. A data recording/reproducing apparatus (such as that shown in FIG. 7) recognizes the respective first or second connecting area 130 or 230 after the first or second data area 120 or 220 by reading the data having the specified pattern. In general, data having a lead-out attribute is recorded as the data having the specified pattern.

The first exclusive area 160 and the second exclusive area 240 are used for a specific purpose by the data recording/reproducing apparatus. For example, the first exclusive area 160 and the second exclusive area 240 are test areas for an optimum power control (OPC). The OPC means that an optimum recording power is determined in the data recording/reproducing apparatus through a preliminary test, before the user data is recorded on the rewritable disc. However, the first exclusive area 160 and the second exclusive area 240 may be used for at least another purpose. For example, the first exclusive area 160 and the second exclusive area 240 may be used to record data indicating the time of recording and the type of data recording/reproducing apparatus. The data recording/reproducing apparatus determines the size of the first exclusive area 160 and the second exclusive area 240 and whether or not they are allocated.

When data is recorded on an optical disc having a plurality of recording layers, if the amount of user data to be recorded is less than the total recordable capacity of the optical disc, and if the amount of user data to be recorded is known to a data recording/reproducing apparatus in advance, then the data recording/reproducing apparatus determines the size of each of the data areas 120 and 220 to record the same amount of user data on each of the plurality of recording layers.

Since the beginning locations of the data areas 120 and 220 are specified, then if the size of each of the data areas 120 and 220 is determined, the ending locations of the data areas 120 and 220 are also determined. If the locations of the data areas 120 and 220 are determined, the locations of the connecting areas 130 and 230 having a specified size are determined. Finally, it is determined whether or not to allocate the first exclusive area 160 and the second exclusive area 240. The size of each of the first exclusive area 160 and the second exclusive area 240 is determined by the data recording/reproducing apparatus later according to the usage frequency of the exclusive area 160 or 240. Since the beginning locations of the first exclusive area 160 and the second exclusive area 240 are specified, then if the size of each of the exclusive areas 160 and 240 is determined, ending locations of the exclusive areas 160 and 240 are also determined.

Various methods may be used to determine whether or not to allocate the first exclusive area 160 and the second exclusive area 240. For example, if the size of the first data area 120 and the second data area 220 are determined, then the locations of the connecting areas 130 and 230 having a specified size are determined. If the locations of the connecting areas 130 and 230 are determined, the size of each of remaining areas from the outer boundaries of the connecting areas 130 and 230 to the outermost circumference is calculated. The data recording/reproducing apparatus allocates the first exclusive area 160 or the second exclusive area 240 to the optical disc when the size of each of remaining areas is larger than a specified standard value. As a non-limiting example, 3% of the total amount of data that can be recorded on one recording layer L1 or L2 may be used as the specified standard value. However, it is to be understood that other amounts can be used.

When the first exclusive area 160 or the second exclusive area 240 is allocated, data indicating the fact is recorded on a specified area, e.g., the lead-in area 110.

The directions of the first exclusive area 160 and the second exclusive area 240 are opposite to each other, and the direction of each exclusive area 160 or 240 is opposite to that of the data area 120 or 220 in the recording layer L1 or L2 in which that exclusive area 160 or 240 exists. Referring to FIG. 5, the direction of the first data area 120 in the recording layer L1 is outward, and the direction of the first exclusive area 160 is inward. On the other hand, the direction of the second data area 220 in the recording layer L2 is inward, and the direction of the second exclusive area 240 is outward.

The first non-usage area 140 and the second non-usage area 260 are completely unused. In an optical disc having a plurality of rewritable recording layers, recording characteristics vary according to which recording layer is recorded first. In particular, the recording characteristics of the outer area of the optical disc are worse than in the inner area. Therefore, no data is recorded by designating an area of the recording layer L2 located at the same location with the first exclusive area 160 as the second non-usage area 260. Likewise, no data is recorded by designating an area of the recording layer L1 located at the same location with the second exclusive area 240 as the first non-usage area 140.

The first buffer area 150 and the second buffer area 250 are prepared considering influences caused by eccentricity of the optical disc and a beam focused on another recording layer. Like the first non-usage area 140 and the second non-usage area 260, no data is recorded on the first buffer area 150 and the second buffer area 250.

Figure 6:
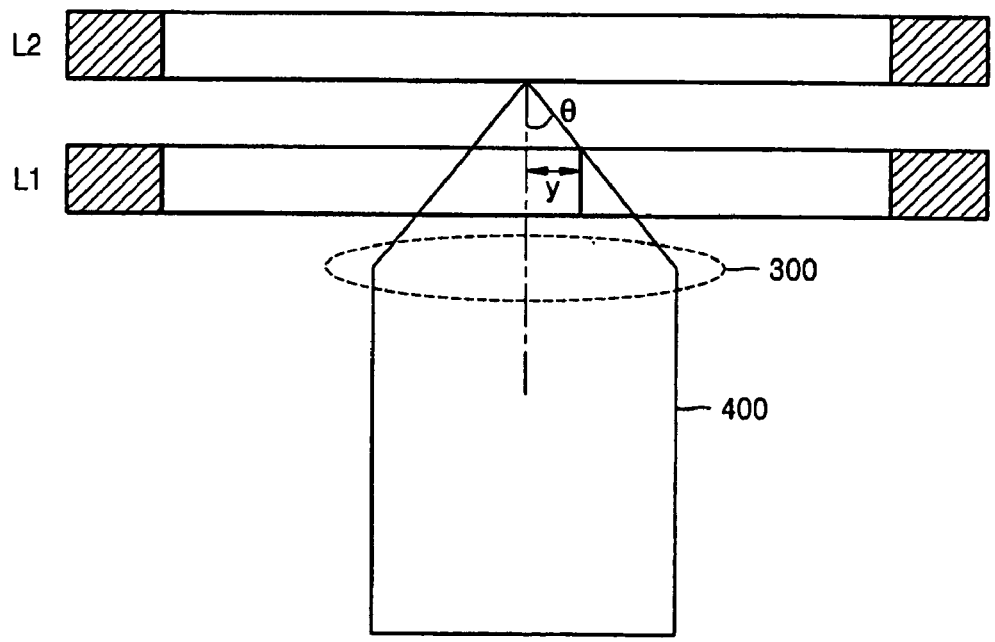
FIG. 6 illustrates a zone of a recording layer L1 affected by a beam focused on a recording layer L2 of the optical disc of FIG. 5.

FIG. 6 illustrates a zone of the recording layer L1 affected by a beam focused on the recording layer L2. Referring to FIG. 6, when a beam 400 is focused on a specific position of the recording layer L2 through an objective lens 300 of a data recording/reproducing apparatus, a zone of the recording layer L1 corresponding to a radius y is affected by the beam 400. The first buffer area 150 and the second buffer area 250 are allocated to a proper size considering the influence of the beam 400 radiated to record data on another recording layer and the eccentricity of the optical disc.

The first non-recording area 170 and the second non-recording area 270 are located on the outmost circumference of the disc and are designated as areas on which data is not recorded to compensate for bad recording characteristics. However, the first non-recording area 170 and the second non-recording area 270 may not be allocated.

An exemplary optical disc having dual recording layers has been described above. However, it is to be understood that the present invention is not limited to this example. Indeed, it is contemplated that the present invention may be applied to optical discs having more than two recording layers.

Figure 7:
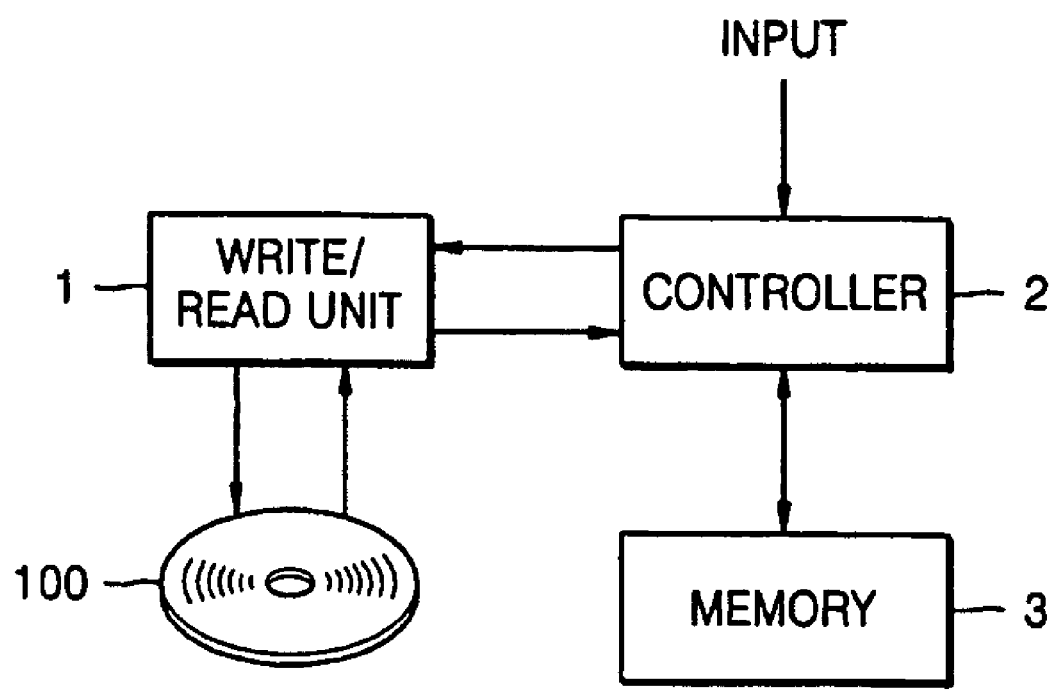
FIG. 7 is a block diagram of a data recording/reproducing apparatus according to an embodiment of the present invention.

FIG. 7 is a block diagram of a data recording/reproducing apparatus according to an embodiment of the present invention. Referring to FIG. 7, the apparatus includes a write/read unit 1, a controller 2, and a memory 3. An optical disc 100 has the structure shown in FIG. 5 according to an embodiment of the present invention.

The write/read unit 1 records data on the optical disc 100 or reads the recorded data, under the control of the controller 2. User data to be recorded on the optical disc 100 is temporarily stored in the memory 3 under the control of the controller 2. Also, data read from the optical disc 100, or various kinds of control data generated during recording or reproducing, is stored in the memory 3.

Referring to FIGS. 5 and 7, the controller 2 determines the size and location of each area of the optical disc 100 as described above. In particular, the controller 2 determines the allocation and location of the first exclusive area 160 and the second exclusive area 240.

The operation of the controller 2 will now be described in more detail. The controller 2 determines the size of the first data area 120 and the second data area 220, to record the same amount of user data on each of a plurality of recording layers when the amount of user data to be recorded on the optical disc 100 is less than the total recordable capacity of the optical disc 100.

Since the beginning (i.e., start) locations of the data areas 120 and 220 are specified, then if the size of each of the data areas 120 and 220 is determined, the ending locations of the data areas 120 and 220 are determined. If the locations of the data areas 120 and 220 are determined, the locations of the connecting areas 130 and 230 having a specified size are automatically determined.

The controller 2 determines whether or not to allocate the exclusive areas 160 and 240 of the recording layers L1 and L2 according to a specified standard. For example, if the sizes of the first data area 120 and the second data area 220 are determined, and if the locations of the connecting areas 130 and 230 having a specified size are determined, the controller 2 can calculate the size of each of the remaining areas from the outer boundaries of the connecting areas 130 and 230 to the outermost circumference. The controller 2 allocates the first exclusive area 160 or the second exclusive area 240 to the optical disc 100 when the size of each of remaining areas is larger than a specified standard value. As a non-limiting example, 3% of the total amount of data that can be recorded on one recording layer L1 or L2 may be used as the specified standard value.

When the first exclusive area 160 or the second exclusive area 240 is allocated, the controller 2 controls the write/read unit 1 to record data indicating that the first exclusive area 160 or the second exclusive area 240 has been allocated on a specified area, e.g., the lead-in area 110.

As described above, the directions of the first exclusive area 160 and the second exclusive area 240 are opposite to each other, and the direction of each exclusive area 160 or 240 is opposite to the direction of the data area 120 or 220 in the recording layer L1 or L2 in which that exclusive area 160 or 240 exists.

In an optical disc having a plurality of rewritable recording layers, the recording characteristics vary according to which recording layer is recorded first, and the recording characteristics of the outer area of the optical disc are worse than in the inner area. Therefore, the controller 2 designates an area of the recording layer L2 at the same location as the first exclusive area 160 as the second non-usage area 260. Likewise, the controller 2 designates an area of the recording layer L1 at the same location as the second exclusive area 240 as the first non-usage area 140.

The controller 2 allocates the first buffer area 150 and the second buffer area 250 considering influences caused by eccentricity of the optical disc and a beam focused on another recording layer. While described in terms of a recording/reproducing apparatus, it is to be understood that the apparatus need not perform both recording and reproduction.

Aspects of the present invention may be embodied in a general-purpose or a specific-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer readable medium having a computer readable program code unit embodied therein for causing a number of computer systems connected via a network to effect distributed processing.

As described above, according to an embodiment of the present invention, exclusive areas can be selectively allocated for a specified purpose, to allow data to be recorded quickly, and to allow data to be recorded reliably on the outer area of the optical disc.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A reproducing apparatus comprising:
a read unit to transfer data with respect to an optical disc, the optical disc comprising a first recording layer and a second recording layer, the first recording layer comprising a first data area, a first connecting area, a first test area, a first buffer area, and a first unused area respectively sequentially arranged in a direction from an inner circumference of the optical disc to an outer circumference of the optical disc, the second recording layer comprising a second data area, a second connecting area, a second unused area, a second buffer area, and a second test area respectively sequentially arranged in the direction from the inner circumference of the optical disc to the outer circumference of the optical disc; and
a controller to control the read unit to reproduce the data with respect to the optical disc;
wherein respective outer boundaries of the first data area and the second data area were determined according to an amount of data recorded in the first data area and the second data area;

respective locations of the first connecting area and the second connecting area were determined according to the determined respective outer boundaries of the first data area and the second data area;
the first connecting area and the second connecting area each store predetermined data;
the first unused area of the first recording layer is disposed within a same radius range of the optical disc as the second test area of the second recording layer, the first buffer area of the first recording layer is disposed within a same radius range of the optical disc as the second buffer area of the second recording layer, and the first test area of the first recording layer is disposed within a same radius range of the optical disc as the second unused area of the second recording layer;
a usage direction of the first test area of the first recording layer is different from a usage direction of the first data area of the first recording layer, and a usage direction of the second test area of the second recording layer is different from a usage direction of the second data area of the second recording layer; and
a starting position from which test data is recorded in the first test area was fixed at an inner boundary of the first test area in the direction from the inner circumference of the optical disc to the outer circumference of the optical disc, and a starting position from which test data is recorded in the second test area was fixed at an outer boundary of the second test area in the direction from the inner circumference of the optical disc to the outer circumference of the optical disc.

2. The apparatus of claim 1, wherein respective end positions of the first test area and the second test area vary based on the respective usage directions of the first test area and the second test area.

3. The apparatus of claim 1, wherein the first recording layer and the second recording layer are adjacent to one another in the optical disc; and
the respective usage directions of the first test area of the first recording layer and the second test area of the second recording layer are opposite to each other.

4. The apparatus of claim 1, wherein the first recording layer and the second recording layer are adjacent to one another in the optical disc; and
the first test area of the first recording layer and the second test area of the second recording layer are disposed at mutually different radial positions of the optical disc.

5. The apparatus of claim 1, wherein the first buffer area has no data recorded therein and abuts the first test area, and the second buffer area has no data recorded therein and abuts the second test area.

6. The apparatus of claim 1, wherein the radius range of the optical disc in which the first unused area of the first recording layer and the second test area of the second recording layer are disposed is a first radius range of the optical disc;
the radius range of the optical disc in which the first buffer area of the first recording layer and the second buffer area of the second recording layer are disposed is a second radius range of the optical disc;
the radius range of the optical disc in which the first test area of the first recording layer and the second unused area of the second recording layer are disposed is a third radius range of the optical disc; and
the first radius range, the second radius range, and the third radius range are mutually exclusive radius ranges that do not overlap one another.

* * * * *